United States Patent
Ostino et al.

(10) Patent No.: US 11,499,436 B2
(45) Date of Patent: Nov. 15, 2022

(54) TURBINE ENGINE BLADE WITH IMPROVED COOLING

(71) Applicants: SAFRAN, Paris (FR); SAFRAN AIRCRAFT ENGINES, Paris (FR)

(72) Inventors: Léandre Ostino, Moissy-Cramayel (FR); Pierre Guillaume Auzillon, Moissy-Cramayel (FR); Romain Pierre Cariou, Moissy-Cramayel (FR); Thomas Olivier Michel Pierre De Rocquigny, Moissy-Cramayel (FR); Patrice Eneau, Moissy-Cramayel (FR); Adrien Bernard Vincent Rollinger, Moissy-Cramayel (FR); Vianney Simon, Moissy-Cramayel (FR); Michel Slusarz, Moissy-Cramayel (FR); Ba-Phuc Tang, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/312,244

(22) PCT Filed: Nov. 29, 2019

(86) PCT No.: PCT/FR2019/052844
§ 371 (c)(1),
(2) Date: Jun. 9, 2021

(87) PCT Pub. No.: WO2020/120862
PCT Pub. Date: Jun. 18, 2020

(65) Prior Publication Data
US 2022/0025771 A1    Jan. 27, 2022

(30) Foreign Application Priority Data
Dec. 12, 2018   (FR) ...................................... 1872794

(51) Int. Cl.
*F01D 5/18*    (2006.01)

(52) U.S. Cl.
CPC .......... *F01D 5/187* (2013.01); *F05D 2230/21* (2013.01); *F05D 2240/307* (2013.01); *F05D 2240/81* (2013.01); *F05D 2250/185* (2013.01)

(58) Field of Classification Search
CPC ........................... F01D 5/187; F05D 2250/185
See application file for complete search history.

(56) References Cited

U.S. PATENT DOCUMENTS 6,168,381 B1 * 1/2001 Reddy .................... F01D 5/186
                                                              416/97 R
7,967,563 B1 * 6/2011 Liang ..................... F01D 5/187
                                                              415/115

(Continued)

FOREIGN PATENT DOCUMENTS

EP     1 065 343 A2    1/2001
EP     1 444 418 A1    8/2004

(Continued)

OTHER PUBLICATIONS

International Search Report dated Mar. 18, 2020 in PCT/FR2019/052844 filed Nov. 29, 2019, 2 pages.

(Continued)

*Primary Examiner* — Eldon T Brockman
(74) *Attorney, Agent, or Firm* — Oblon, McClelland, Maier & Neustadt, L.L.P.

(57) ABSTRACT

A turbine blade including a root carrying an impeller terminated by a tip in the form of a squealer tip. This impeller also includes a serpentine median circuit, including a first radial pipe collecting air at the root and that is connected by a first bend to a second radial pipe that is connected by a second bend to a third radial pipe, a cavity under the squealer tip running along the pressure side wall, extending from a central region of the tip to the trailing edge, and a radial (Continued)

central pipe collecting air at the root extending between at least two of the three pipes of the median circuit and directly supplying the cavity under the squealer tip.

14 Claims, 4 Drawing Sheets

(56) References Cited

U.S. PATENT DOCUMENTS

| | | | |
|---|---|---|---|
| 11,035,235 B2* | 6/2021 | Dujol | ................ F01D 5/187 |
| 2004/0076519 A1 | 4/2004 | Halfmann et al. | |
| 2019/0376394 A1* | 12/2019 | Dujol | ................ F01D 5/187 |

FOREIGN PATENT DOCUMENTS

| | | |
|---|---|---|
| FR | 3 021 697 A1 | 12/2015 |
| FR | 3 057 906 A1 | 4/2018 |
| WO | WO 03/042503 A1 | 5/2003 |

OTHER PUBLICATIONS

Preliminary French Search Report dated Sep. 30, 2019 in French Patent Application No. 1872794 filed Dec. 12, 2018, 2 pages (with Translation of Category).

* cited by examiner

TURBINE ENGINE BLADE WITH IMPROVED COOLING

TECHNICAL FIELD

The invention relates to an aircraft engine vane of the turbomachine type, such as for example a turbojet or turboprop engine, and it applies especially to a high-pressure type vane.

STATE OF PRIOR ART

Figure 1:
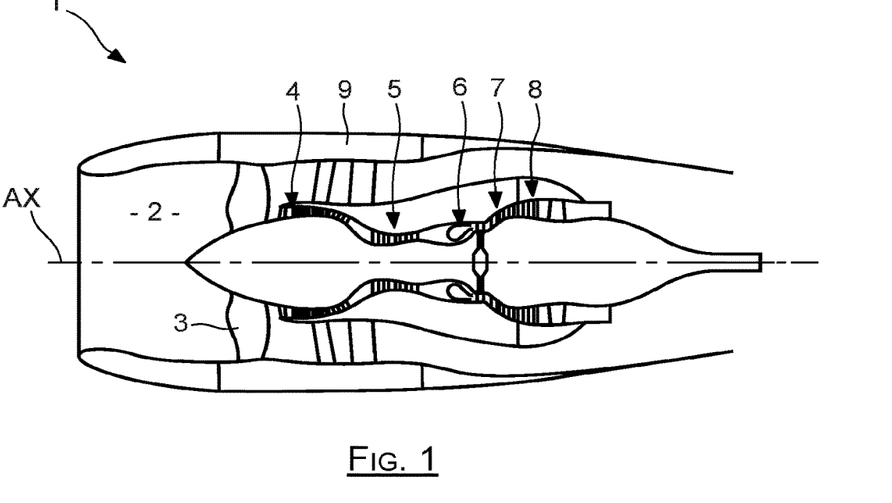
FIG. 1 is a cross-section view of a known turbojet engine.

In such an engine of the turbojet type, denoted as 1 in FIG. 1, air is supplied into an inlet duct 2 to pass through a fan comprising a series of rotating blades 3 before splitting into a central primary flow and a secondary flow surrounding the primary flow.

The primary flow is compressed by low-pressure 4 and high-pressure 5 compressors before reaching a combustion chamber 6, after which it expands by passing through a high-pressure turbine 7 and a low-pressure turbine 8, before being discharged by generating auxiliary thrust. The secondary flow is in turn propelled directly by the fan to generate main thrust.

Each turbine 7, 8 has a series of radially oriented vanes evenly spaced about an axis of rotation AX, with an outer casing 9 surrounding the entire engine.

Cooling the turbine vanes is ensured by circulating in each vane air taken from upstream of the combustion chamber and supplied at the root of the vane, this air being discharged by perforations and/or slots passing through the walls of these vanes.

Generally speaking, the cooling efficiency, and in particular the reduction in the flow rate required to cool high-pressure turbine vanes, makes it possible to reduce fuel consumption of a turbojet engine and to increase the life time of the vanes. In this respect, different vane arrangements have been provided, as especially in patent document FR3021697.

Nevertheless, it appears that cooling high-pressure turbine vanes requires constant improvement, especially due to the continuous change in operating conditions, manufacturing processes and performance requirements.

Within this context, the purpose of the invention is to provide a new vane design with an improved cooling circuit.

DISCLOSURE OF THE INVENTION

For this purpose, one object of the invention is a turbine of a turbomachine such as a turbojet engine, for being mounted about an axis of rotation on a rotor disc rotating about an axis of rotation, comprising a root for mounting thereof in a cell of the disc, and a hollow blade extending from the root in a radial spanwise direction terminating in a top forming a bathtub, the blade comprising a lower surface wall and an upper surface wall, as well as a leading edge, a trailing edge and a top wall defining a bottom of the bathtub, and through which the lower surface wall is connected to the upper surface wall, this blade also comprising:
- a paper clip-type median circuit, including a first radial duct collecting air at the root and which is connected through a first bend to a second radial duct which is connected through a second bend to a third radial duct
- an under-bathtub cavity located on the side of the lower surface wall and the top wall and which extends from a central region of the top to the trailing edge;
- a central radial duct on the lower surface wall side which collects air at the root and extends between at least two of the three ducts of the medial circuit and directly feeds the under-bathtub cavity.

By virtue of the under-bathtub cavity feed from a central duct between the coil type circuit ducts, air conveyed to the under-bathtub cavity heats up little, thus enabling the lower surface wall near the top and the trailing edge to be effectively cooled.

The invention also relates to a vane thus defined, wherein an end of the third duct and at least part of the first bend are located between the under-bathtub cavity and the upper surface wall.

The invention also relates to a vane thus defined, wherein the central duct and the under-bathtub cavity form an L-shaped duct located on the side of the lower surface wall.

The invention also relates to a vane thus defined, wherein the central duct extends between at least two ducts of the median circuit which both extend over most of their respective lengths from the upper surface wall to the lower surface wall.

The invention also relates to a vane thus defined, wherein the first radial duct and the third radial duct both extend over most of their lengths from the upper surface wall to the lower surface wall, and wherein the central duct extends on the one hand between the first duct and the third duct, and on the other hand between the second duct and the lower surface wall.

The invention also relates to a vane thus defined, wherein the lower surface wall has cooling holes passing therethrough and opening into the third duct to form a cooling film of the lower surface wall upstream of the trailing edge.

The invention also relates to a vane thus defined, wherein the lower surface wall is devoid of holes opening into the first duct or the second duct.

The invention also relates to a vane thus defined, including cooling slots passing through the lower surface wall along the trailing edge for cooling it, and wherein at least one of these slots is located on the top side and is fed with cooling air through the under-bathtub cavity.

The invention also relates to a vane thus defined, comprising an additional downstream circuit having a radial downstream duct collecting air at the root to feed a plurality of cooling slots of the trailing edge.

The invention also relates to a vane thus defined, wherein the downstream duct feeds the slots via a downstream ramp with which it communicates through axial channels.

The invention also relates to a vane thus defined, comprising at least one radial upstream duct dedicated to cooling the leading edge, this upstream duct collecting cooling air at the root to cool the leading edge by discharging this air through holes passing through the vane wall at the leading edge.

The invention also relates to a turbomachine comprising a vane thus defined.

The invention also relates to a turbine comprising a vane thus defined.

The invention also relates to a ceramic core for manufacturing a turbine vane of a turbomachine such as a turbojet engine, for being mounted about an axis of rotation on a rotor disc rotating about an axis of rotation, comprising a root for mounting thereof in a cell of the disc, and a hollow blade extending from the root in a radial spanwise direction terminating in a top forming a bathtub, the blade comprising a lower surface wall and an upper surface wall, as well as a leading edge, a trailing edge and a top wall delimiting a bottom of the bathtub, and through which the lower surface wall is connected to the upper surface wall, this core comprising:
- a core element to form a paper clip-type median circuit, including a first radial duct collecting air at the root and which is connected through a first bend to a second radial duct which is connected through a second bend to a third radial duct;
- a further core element to form an under-bathtub cavity located on the side of the lower surface wall and of the top wall and extending from a central region of the top to the trailing edge, as well as a central radial duct located on the side of the lower surface wall and which collects air at the root and extending between at least two of the three ducts of the median circuit and directly feeding the under-bathtub cavity.

DETAILED DISCLOSURE OF PARTICULAR EMBODIMENTS

The idea underlying the invention is to design a vane in which the airflow required to cool its median part is reduced to promote better cooling of its critical parts, such as in particular the lower surface wall in the region of the top near the trailing edge.

General Arrangement of the Vane

Figure 2:
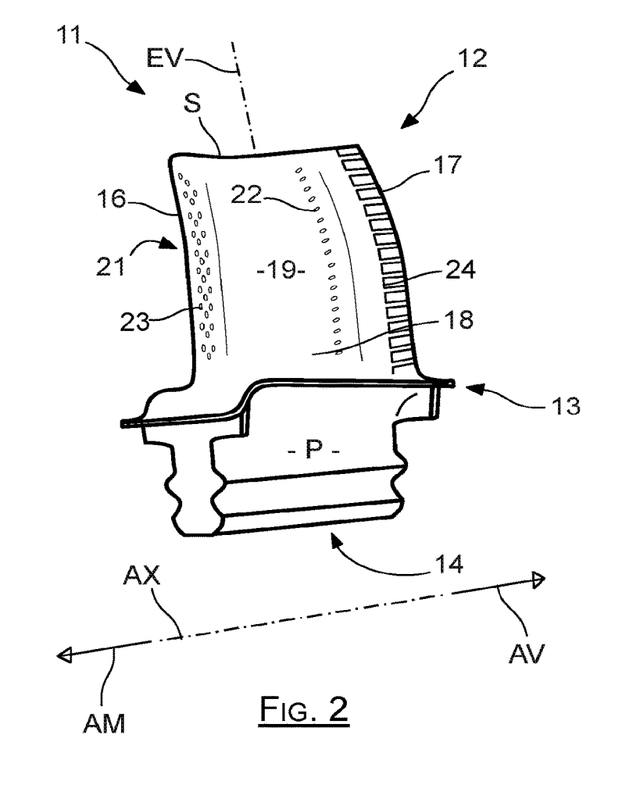
FIG. 2 is an outer perspective view of a vane according to the invention.

The vane according to the invention, denoted as 11 in FIG. 2, comprises a root P through which it is fixed to a cell of a rotor disc called a turbine disc, and a blade 12 carried by this root P, with a platform 13 connecting the root P to the blade 12. This vane 11, which is hollow, has four inner circuits in which cooling air flows which supplied through four mouths located at a radially lower face 14 of the root P.

The blade 12 has a shape twisted about a so-called spanwise axis EV, which is substantially perpendicular to an axis of rotation AX of the rotor carrying the vane, this axis of rotation being a longitudinal axis of the engine. It comprises a leading edge 16 substantially parallel to the spanwise direction EV and located upstream AM or at the front of the vane, with respect to the general direction of gas circulation in the turbomachine. It comprises a trailing edge 17 substantially parallel to the leading edge 16 and spaced from the latter along the axis AX to be downstream AV or at the rear of the vane. It further comprises a top S substantially parallel to and spaced from the base 18 along the spanwise direction EV.

Both main walls of this vane are its lower surface wall 19, visible in FIG. 2, and its upper surface wall 21, which are spaced from each other while being joined at the leading edge 16, at the trailing edge 17, and in the region of the top S. The lower surface wall has cooling holes 22 passing therethrough and is fed through an inner cooling circuit to form a film on the outer surface of the lower surface 19 in order to thermally protect it in the region upstream of the trailing edge 17.

The leading edge 16 is domed and has cooling holes 23 passing through its wall, and the trailing edge 17 which is tapered has a series of cooling slots. These slots 24 are of small lengths and extend in parallel to the spanwise direction EV, by being spaced apart and extending from each other, and located at a short distance from the trailing edge itself. Each slot 24 passes through the lower surface wall to blow air over the outer face of the lower surface wall towards the trailing edge which is provided with outer ribs channeling this air in parallel to the axis AX.

Figure 3:
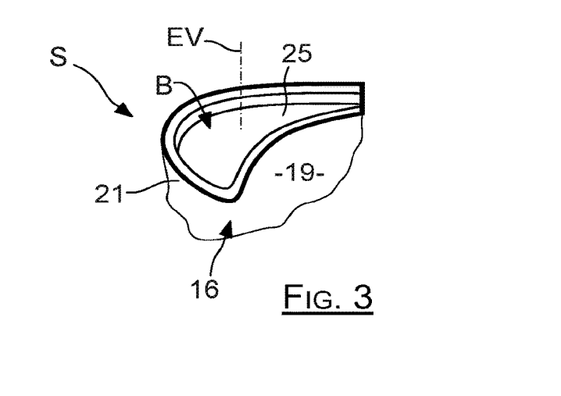
FIG. 3 is a perspective view of the top of the vane according to the invention.

As is visible in FIG. 3, the top S includes a top wall 25 oriented perpendicular to the spanwise direction EV, which connects the lower surface and upper surface walls. This top wall 25 is set back towards the axis AX relative to the free edges of the upper surface and lower surface walls, to form, together with them, a hollow portion, known as a bathtub and denoted as B, which is open in the opposite direction to the axis AX.

This vane is a one-piece piece made by casting a metal material, which is obtained by using a set of cores to delimit its inner cooling ducts, these cores being removed after casting and cooling, for example with a chemical etching process. FIGS. 4 to 12 show inner regions of the vane represented therein by the shapes of the cores for making this vane. The shapes in these FIGS. 4 to 12 are in relief, but they are representations of the hollow shapes of the vane.

The vane 11 according to the invention has four inner cooling circuits: an upstream circuit 26; a central circuit 27; a median circuit 28 extending on either side of the central circuit; and a downstream circuit 29.

The vane is manufactured by casting using ceramic cores comprising four core elements which can be rigidly secured together, each core element delimiting one of the circuits 26, 27, 28 and 29.

Upstream Circuit

Figure 4:
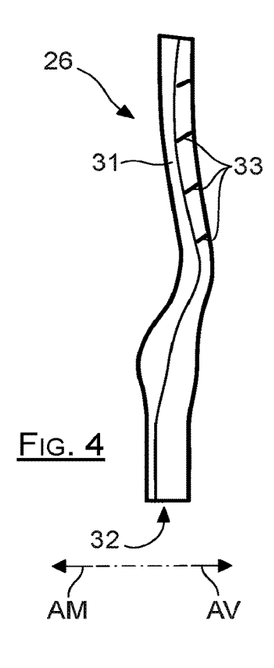
FIG. 4 is a view of the upstream cooling circuit of the vane according to the invention represented alone and seen from the lower surface side.

As visible in FIG. 4, the upstream circuit 26 includes a radial upstream duct 31, that is extending parallel to the spanwise direction EV. This duct extends from its mouth 32 located at the root P of the blade, to a top region S located below the bathtub: it is terminated by the top wall delimiting the bottom of the vane bathtub.

The air collected in the mouth 32 travels through the duct 31 to feed the cooling holes 23 to ensure effective cooling of the wall portion making up the leading edge 16 of the vane.

In addition, the upstream duct 31 has flow disruptors 33, that is elements forming a relief on its inner face, which generate turbulence in the air flow in order to enhance heat exchanges between the air and the walls of the vane which delimit this duct 31.

Central Circuit

Figure 6:
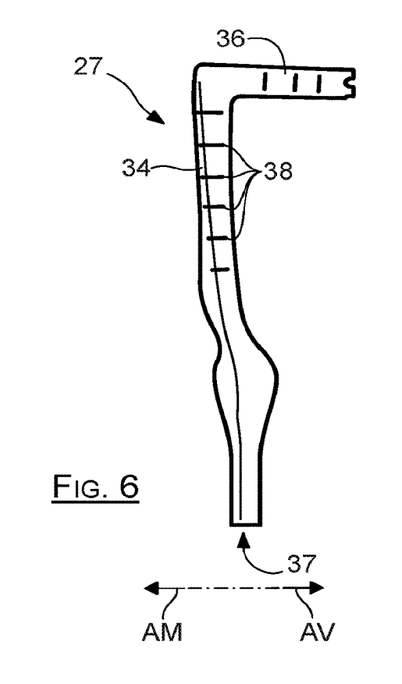
FIG. 6 is a view of the central cooling circuit of the vane according to the invention represented alone and seen from the lower surface side.

The central circuit 27 which appears in FIG. 6 comprises a radial central duct 34 from which an axial under-bathtub cavity 36 extends, that is oriented parallel to the axis AX, this central duct 34 being dedicated to the air feed of this under-bathtub cavity 36 dedicated to cooling the lower surface wall in the region of the top S close to the trailing edge. The central duct 34 extends from the root P of the blade where it has a mouth 37 through which it collects cooling air, and is terminated by the top wall 25.

The under-bathtub cavity 36 extends longitudinally from a central region of the top S to the trailing edge 17, and the upstream end of this cavity 36 is connected to the radial end of the central duct 34 to be fed with air through it.

This under-bathtub cavity 36 is laterally delimited on the one hand by the lower surface wall 19 over the length of this cavity, and on the other hand by the upper surface wall in the vicinity of the trailing edge 17 and in the front part by an inner wall of the vane separating the median circuit from the central circuit. This under-bathtub cavity 36 is delimited along the spanwise axis EV, by the top wall 25, and by a bottom parallel to this top wall and spaced from it.

The central duct 34 is in turn laterally delimited by the lower surface wall 19, and by the wall separating the central circuit 27 from the median circuit 28. Air flowing in this central duct 34 is thus in contact with the lower surface wall 19, but not with the upper surface wall 21.

As visible in FIG. 6, the central circuit 27 has flow disruptors 38 at its central duct 34 and at the under-bathtub cavity 36 which generate turbulence in order to enhance heat exchanges between the air and the vane thereat.

The under-bathtub cavity 36 thus extends mainly at the top of the vane along the lower surface in the region close to the trailing edge 17 in order to ensure maximum cooling by heat exchange in this region, which is subjected to a high gas temperature and is critical with regard to oxidation and scaling. This cavity 36 makes it possible especially to feed one or more of the cooling slots 24 of the trailing edge on the lower surface side which are closest to the top S with very fresh air, while effectively ventilating the lower surface wall 19 close to the top S and to the trailing edge 17 via its inner face.

Coil-Type Median Circuit

Figure 5:
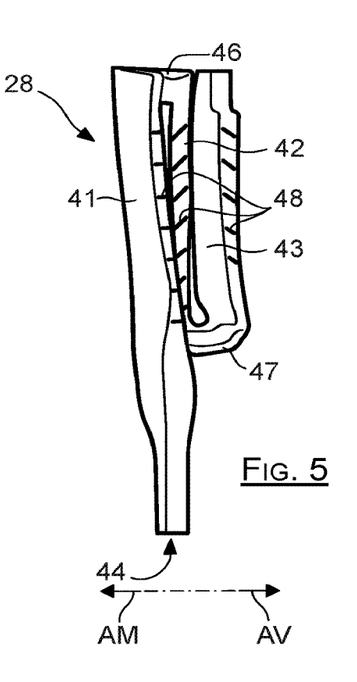
FIG. 5 is a view of the median cooling circuit of the vane according to the invention represented alone and seen from the lower surface side.

The median circuit 28, which is visible in FIG. 5, includes three radial ducts 41, 42 and 43 communicating with each other in a coil arrangement, also known as a paper clip, to maximise air path in order to make most of the air coming from this duct work. The first and third ducts 41 and 43 are located respectively upstream and downstream of the central duct 34 of the circuit 27, while the second duct 42 is at the same level as the central duct 34 along the axis AX, by being interposed between this central duct 34 and the upper surface wall.

The ducts 41, 42, 43 making up the median circuit 28 are thus located around the central duct 34, to limit heating of the air conveyed by this central duct 34 towards the under-bathtub cavity 36 dedicated to cooling the lower surface wall close to the top and the trailing edge.

Furthermore, the ducts 41, 42, 43 of this median circuit 28 form a coil and each comprise flow disruptors 48 so as to promote heat exchange between the air which passes through them and the lower surface and upper surface walls.

First Duct:

The first duct 41 is thus located longitudinally between the upstream duct 31 of the upstream circuit 26 and the central duct 34 of the central circuit 27, by running alongside both of them. This first duct 41 collects air at the root P through its mouth 44 and is terminated at the top wall by being connected to the second duct 42 through a first bend 46. This first duct 41 extends laterally from the upper surface wall 21 to the lower surface wall 19, so that the air travelling therethrough in direct contact with the upper surface and lower surface walls.

This first duct 41 is devoid of perforations passing through the lower surface wall 19 and perforations passing through the upper surface wall 21: it does not generate a cooling film on the outer face of the vane. This promotes a high flow rate in this first duct. As the air circulates in this first duct from the root P to the top S, it is pressed against the lower surface wall by the Coriolis effect, but the extent of the contact area with the lower surface wall is reduced: this combination allows heat exchange with the lower surface wall to be increased to cool it to a maximum.

Second Duct:

The second duct 42 of the median circuit 28 runs alongside the first duct 41 and the central duct 34 of the central circuit 27, extending laterally between the upper surface wall 21 and the inner wall which separates it from the central duct 34, this central duct in turn extending laterally from this inner wall to the lower surface wall 19. This second duct 42 thus has a thickness in the lateral direction which is in the order of half that of the first duct 41, and air which circulates therein is in contact with the upper surface wall 21 but is not in contact with the lower surface wall 19.

This second duct 42 is also devoid of holes passing through the upper surface wall 21: it does not contribute to cooling through an outer film, in order to promote a high flow rate also in this second duct 42. As the air circulates through this second duct 42 from the top S to the root P, it is pressed by the Coriolis effect against the upper surface wall 21 which is subjected to a lower gas temperature than the lower surface wall, so that heating-up of the air in this second duct 42 is relatively low.

Inner Wall:

The inner wall of the vane, not shown in the figures, extends between the second duct 42 of the median circuit 28, and the central duct 34 of the central circuit 27, is a curved central wall extending on the one hand from the base 18 to the region of the top S, and on the other hand from the lower surface 19 to the upper surface 21. In operation, this inner wall has a relatively low temperature because it is not in contact with the fluid in which the vane is immersed. In addition, this inner wall takes up a large part of the centrifugal loads experienced by the vane in service, which limits damage to the vane by creep.

Third Duct:

The second duct 42 is connected in the region of the base 18 of the vane to the third duct 43, through a second bend 47 located laterally between the upper surface wall and the inner wall.

The third duct 43 is spaced from the second duct 42 along the axis AX, and runs alongside it, extending from the base 18 to the under-bathtub region, in parallel to the central duct 34 it also runs alongside. Over most of its length, this third duct 43 extends laterally from the lower surface wall 19 to the upper surface wall 21. But, at its terminal end, the cross-section area of this third duct 43 is reduced so that it extends laterally from the under-bathtub cavity 36 to the upper surface wall 21, and it is terminated by the top wall 25.

The air circulating in this third duct 43 is thus in direct contact with the lower surface and upper surface walls for most of its length, but is in contact only with the upper surface in the end portion of this duct as it extends from the under-bathtub cavity 36 to the upper surface wall 21.

The mouth 44 is the sole air feed pathway for the whole central circuit, this air passing through ducts 41, 42 and 43 successively. When it travels through the first and second ducts 41 and 42, this air retains a high flow rate due to the absence of perforations in these two ducts, and is only slightly heated up therein. When the air reaches the third duct 43, it has a high flow rate and a low temperature, allowing this part to be effectively cooled. Cooling this part is especially ensured by means of the cooling holes 22 passing through the lower surface wall 19 to form an air film thermally protecting the outer face of the lower surface wall 19 upstream of the trailing edge 17.

Generally speaking, by virtue of the combination of the central circuit 27 and the median circuit 28 according to the invention, the air flow rate to cool the zone in the middle of the blade is lower than the flow rate required with a conventional cooling circuit.

Arrangement of the Median Circuit in Relation to the Under-Bathtub Cavity

As is more clearly visible in FIGS. 9 to 12, the under-bathtub cavity 36 extends from the lower surface side, relative to the top of the third duct 43 and the first bend 46, both of which run alongside the upper surface. This under-bathtub cavity 36 is thus dedicated to cooling the lower surface wall 19 at the top of the vane: the small flow of relatively heated up air arriving at the top of the third duct 43 is not used to cool the top of the vane on the lower side close to the trailing edge.

Figure 11:
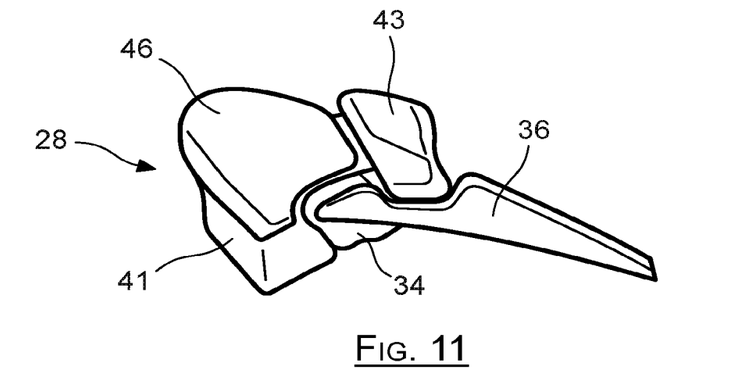
FIG. 11 shows the under-bathtub cavity as well as the second bend and the first and third ducts seen in the spanwise direction at a distance from the longitudinal axis.
Figure 12:
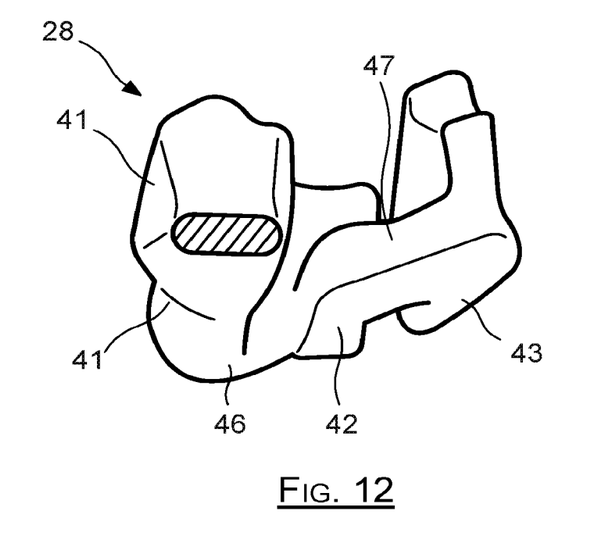
FIG. 12 shows the median circuit alone as seen from the longitudinal axis.

Within this scope, and as more clearly visible in FIGS. 11 and 12, the cross-section area of the third duct 43 is narrowed at its top, so as to free up space for the under-bathtub cavity 36.

Downstream Circuit

Figure 7:
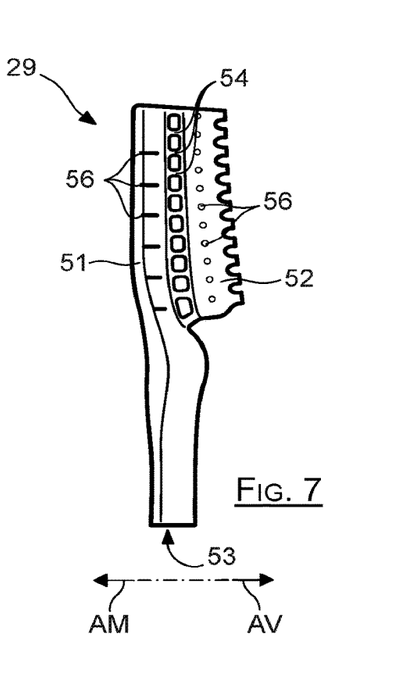
FIG. 7 is a view of the downstream cooling circuit of the vane according to the invention represented alone and seen from the lower surface side.
Figure 8:
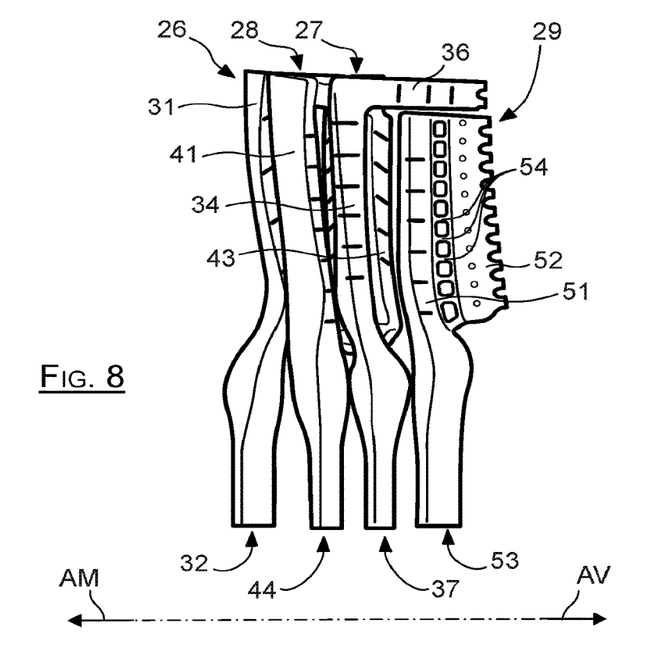
FIG. 8 is an overview of the four cooling circuits as arranged in the vane according to the invention and seen from the lower surface side.
Figure 9:
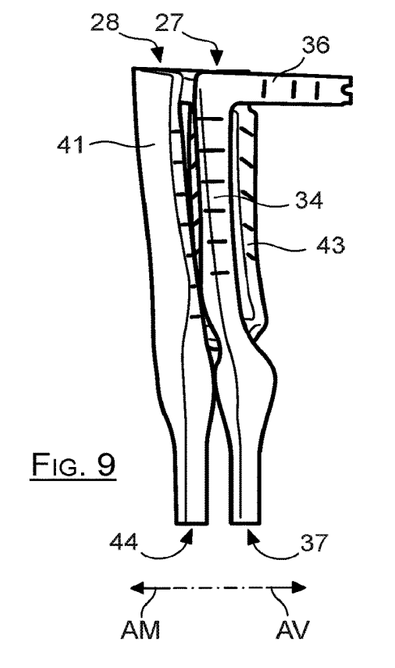
FIG. 9 is an overview showing the median and central cooling circuits as arranged in the vane according to the invention and seen from the lower surface side.
Figure 10:
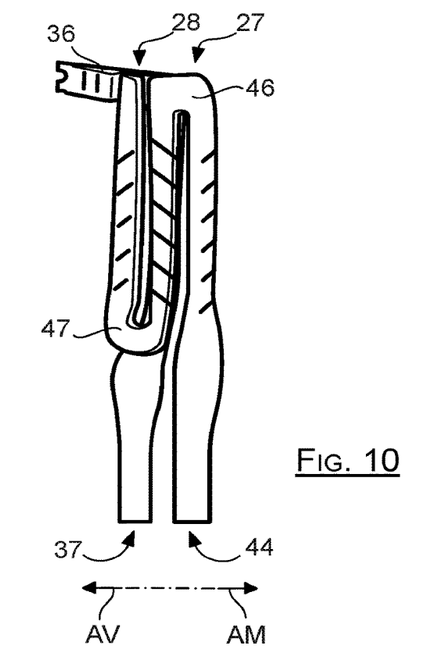
FIG. 10 is an overview showing the median and central cooling circuits as arranged in the vane according to the invention and seen from the upper surface side.

As visible in FIG. 7, the downstream circuit 29 includes a downstream duct 51 feeding a downstream ramp 52 which runs alongside this downstream duct 51 and which in turn feeds the cooling slots 24.

More particularly, the downstream ramp 52 is at a distance from the duct 51 along the axis AX, and is connected to it by a series of axial channels 54, that is in parallel to the axis AX. These channels 54, which each extend in parallel to the axis AX, are regularly spaced from one another along the spanwise direction EV, and ensure a homogeneous air feed to the downstream ramp 52 over its entire height, each channel having a calibrated, that is predetermined, passage cross-section area.

The duct 51 and the ramp 52 extend in parallel to the direction EV from a mouth 53 located at the root P and through which cooling air is collected, to the under-bathtub cavity 36.

This downstream duct 51 as well as the ramp 52 advantageously comprise flow disruptors 56 to generate turbulence and thus promote heat exchange with the lower surface wall.

Advantages

Generally, the vane according to the invention makes it possible to reduce the air flow rate required for its cooling, by significantly reducing the flow rate required for cooling its median portion of the vane extending substantially halfway between its leading edge and its trailing edge, and by preserving fresh air for cooling the upper surface close to the top and the trailing edge.

By virtue of the feed to the under-bathtub cavity through a central duct located between the ducts of the coil-type circuit, air conveyed to the under-bathtub cavity heats up little, thus enabling the lower surface wall near the top and trailing edge to be effectively cooled.

The first and second duct of the coil circuit being devoid of holes towards the upper surface and lower surface, a large flow rate in the coil circuit can be maintained to effectively cool the outer faces of the downstream part of the vane by virtue of the third duct of the coil-type circuit.

With this arrangement, the upstream circuit has a single duct dedicated to cooling the leading edge, which is hence also maximally cooled.

The invention claimed is:

1. A turbine vane of a turbomachine, for being mounted about an axis of rotation on a rotor disc rotating about an axis of rotation, comprising a root for mounting thereof in a cell of the disc, and a hollow blade extending from the root in a radial spanwise direction and terminating in a top forming a bathtub, the blade comprising a lower surface wall and an upper surface wall, as well as a leading edge, a trailing edge and a top wall delimiting a bottom of the bathtub, and with which the lower surface wall is connected to the upper surface wall, said blade also comprising:
    a paper clip-type median circuit, including a first radial duct collecting air at the root and which is connected through a first bend to a second radial duct which is connected through a second bend to a third radial duct;
    an under-bathtub cavity located on the side of the lower surface wall and the top wall and which extends from a central region of the top to the trailing edge;
    a central radial duct located on the side of the lower surface wall and which collects air at the root and extends between at least two of the three ducts of the median circuit and directly feeds the under-bathtub cavity.

2. The vane of claim 1, wherein one end of the third duct and at least part of the first bend are located between the under-bathtub cavity and the upper surface wall.

3. The vane according to claim 1, wherein the central duct and the under-bathtub cavity form an L-shaped duct located on the side of the lower surface wall.

4. The vane according to claim 1, wherein the central duct extends between at least two ducts of the median circuit, said at least two ducts extending each over most of their respective lengths from the upper surface wall to the lower surface wall.

5. The vane according to claim 4, wherein the first radial duct and the third radial duct both extend over most of their lengths from the lower surface wall to the upper surface wall, and wherein the central duct extends on the one hand between the first radial duct and the third radial duct, and on the other hand between the second radial duct and the lower surface wall.

6. The vane according to claim 1, wherein the lower surface wall comprises cooling holes which pass therethrough and open into the third radial duct to form a cooling film of the lower surface wall upstream of the trailing edge.

7. The vane according to claim 1, wherein the lower surface wall is devoid of holes opening into the first radial duct or into the second radial duct.

8. The vane according to claim 7, wherein the downstream duct feeds the slots via a downstream ramp with which it communicates through axial channels.

9. The vane according to claim 1, comprising cooling slots passing through the lower surface wall along the trailing edge to cool it, and wherein at least one of these slots is located on a side of the top and is fed with cooling air by the under-bathtub cavity.

10. The vane according to claim 9, comprising an additional downstream circuit having a radial downstream duct collecting air at the root to feed several cooling slots of the trailing edge.

11. The vane according to claim 1, comprising at least one radial upstream duct dedicated to cooling the leading edge, said radial upstream duct collecting cooling air at the root to cool the leading edge by discharging said air through holes passing through the blade wall at the leading edge.

12. A turbine of a turbomachine comprising a vane according to claim 1.

13. A turbomachine comprising a turbine according to claim 12.

14. A ceramic core for manufacturing a turbine vane of a turbomachine, for being mounted about an axis of rotation on a rotor disc rotating about an axis of rotation, comprising a root for mounting thereof in a cell of the disc, and a hollow blade extending from the root in a radial spanwise direction and terminating in a top forming a bathtub, the blade comprising a lower surface wall and an upper surface wall, as well as a leading edge, a trailing edge and a top wall delimiting a bottom of the bathtub, and through which the lower surface wall is connected to the upper surface wall, said core comprising:

a core element to form a paper clip-type median circuit, including a first radial duct collecting air at the root and which is connected through a first bend to a second radial duct which is connected through a second bend to a third radial duct;

a further core element to form an under-bathtub cavity located on the side of the lower surface wall and the top wall and which extends from a central region of the top to the trailing edge, as well as a central radial duct located on the side of the lower surface wall and which collects air at the root and extends between at least two of the three ducts of the median circuit and directly feeds the under-bathtub cavity.

* * * * *